US012670052B2

(12) United States Patent
Nagashima et al.

(10) Patent No.: US 12,670,052 B2
(45) Date of Patent: Jun. 30, 2026

(54) MEMORY SYSTEM AND METHOD

(71) Applicant: Kioxia Corporation, Tokyo (JP)

(72) Inventors: Hirokazu Nagashima, Fujisawa Kanagawa (JP); Hiroki Kobayashi, Kamakura Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/589,605

(22) Filed: Feb. 28, 2024

(65) Prior Publication Data

US 2024/0320076 A1    Sep. 26, 2024

(30) Foreign Application Priority Data

Mar. 23, 2023    (JP) ................................. 2023-046769

(51) Int. Cl.
*G06F 11/00* (2006.01)
*G06F 11/07* (2006.01)

(52) U.S. Cl.
CPC .......... *G06F 11/076* (2013.01); *G06F 11/073* (2013.01)

(58) Field of Classification Search
None
See application file for complete search history.

(56) References Cited

U.S. PATENT DOCUMENTS 10,665,305 B2    5/2020   Yao et al.
11,138,064 B2 *  10/2021  Richter ............... G06F 11/1068

11,189,359 B1 *  11/2021  Cariello ................. G11C 29/14
11,450,397 B2    9/2022   Ramachandran Nair
2014/0204671 A1 *  7/2014  Sharon ............... G11C 16/0483
                                    365/185.09
2014/0226398 A1 *  8/2014  Desireddi ............ G11C 16/349
                                    365/185.03
2017/0148525 A1 *  5/2017  Kathawala ............ G06F 11/079
2018/0350446 A1 *  12/2018  K ............................ G11C 29/76
2019/0378588 A1 *  12/2019  Mochizuki ....... G11C 29/56008
2020/0019461 A1 *  1/2020  Sugiyama ........... G06F 11/1048
2020/0057687 A1 *  2/2020  Louie .................. G11C 11/1675
2020/0194061 A1 *  6/2020  Avital ............. G11C 29/50004
2022/0113896 A1    4/2022   Ahn et al.
2022/0129185 A1 *  4/2022  Boehm ................ G06F 3/0616
2023/0103694 A1 *  4/2023  Kang .................... G11C 29/42

* cited by examiner

*Primary Examiner* — Mujtaba M Chaudry

(74) *Attorney, Agent, or Firm* — Foley & Lardner LLP

(57) ABSTRACT

A controller of a memory system executes a first operation on storage regions. The first operation includes (i) acquiring first data based on comparison between a determination voltage and a threshold voltage of each memory cell in a first storage region; (ii) calculating a first fail-bit count of the first data; and (iii) executing or skipping a second operation based on the calculated first fail-bit count. The second operation includes (i) acquiring the second data based on comparison between the determination voltage and the threshold voltage of each memory cell in the first storage region; (ii) calculating a second fail-bit count of the second data; and (iii) updating the determination voltage based on the second fail-bit count.

20 Claims, 12 Drawing Sheets

FIG. 7
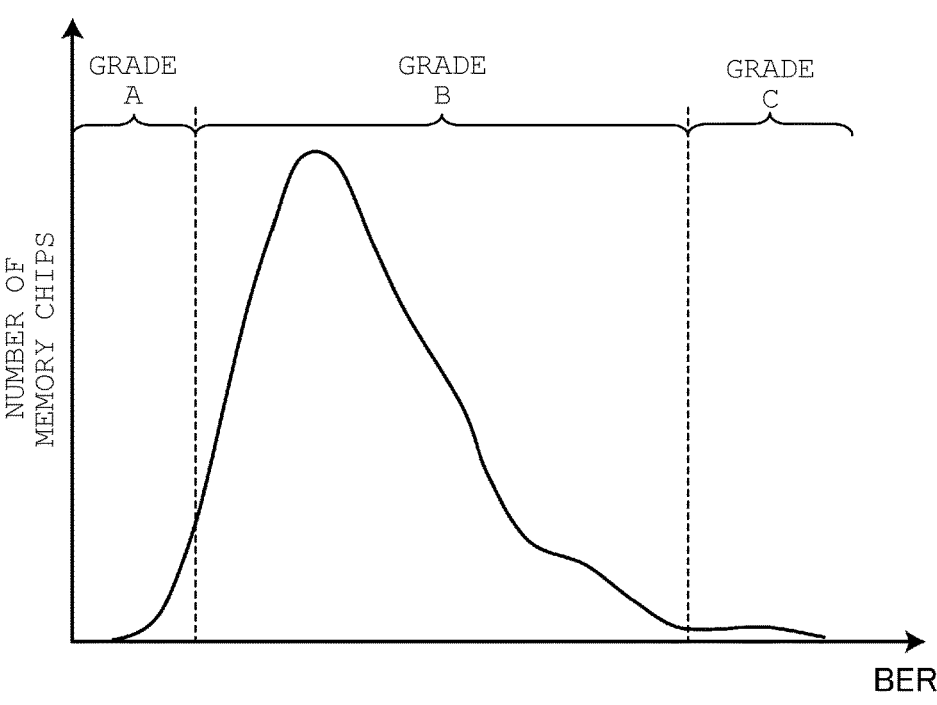
FIG. 8A
CL0    CL0    CL0    CL0    CL0    P0
FIG. 8B
CL1    CL1    CL1    CL1    P1
FIG. 9
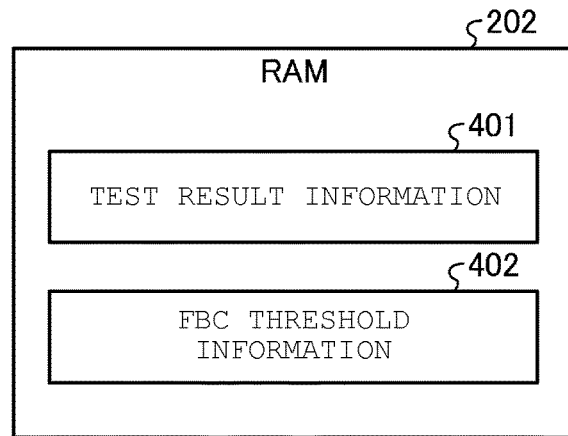

| ch | MEMORY CHIPS | BER |
|---|---|---|
| 0 | 0 | 1.85E-04 |
| 0 | 1 | 2.54E-04 |
| 0 | 16 | 2.47E-04 |
| 0 | 17 | 2.36E-04 |
| 0 | 32 | 1.91E-04 |
| 0 | 33 | 2.30E-04 |
| 0 | 48 | 2.53E-04 |
| ⋮ | ⋮ | ⋮ |
| 17 | 113 | 2.13E-04 |

| GRADE | FILLING RATE | FBC THRESHOLD |
|---|---|---|
| A | 32 | X0 |
| A | 31 | X1 |
| ⋮ | ⋮ | ⋮ |
| A | 25 | X8 |
| B | 32 | Y0 |
| B | 31 | Y1 |
| B | 30 | Y2 |
| ⋮ | ⋮ | ⋮ |
| B | 30 | Y8 |
| C | 32 | Z0 |
| C | 31 | Z1 |
| C | 30 | Z2 |
| ⋮ | ⋮ | ⋮ |
| C | 25 | Z8 |

*FIG. 15*

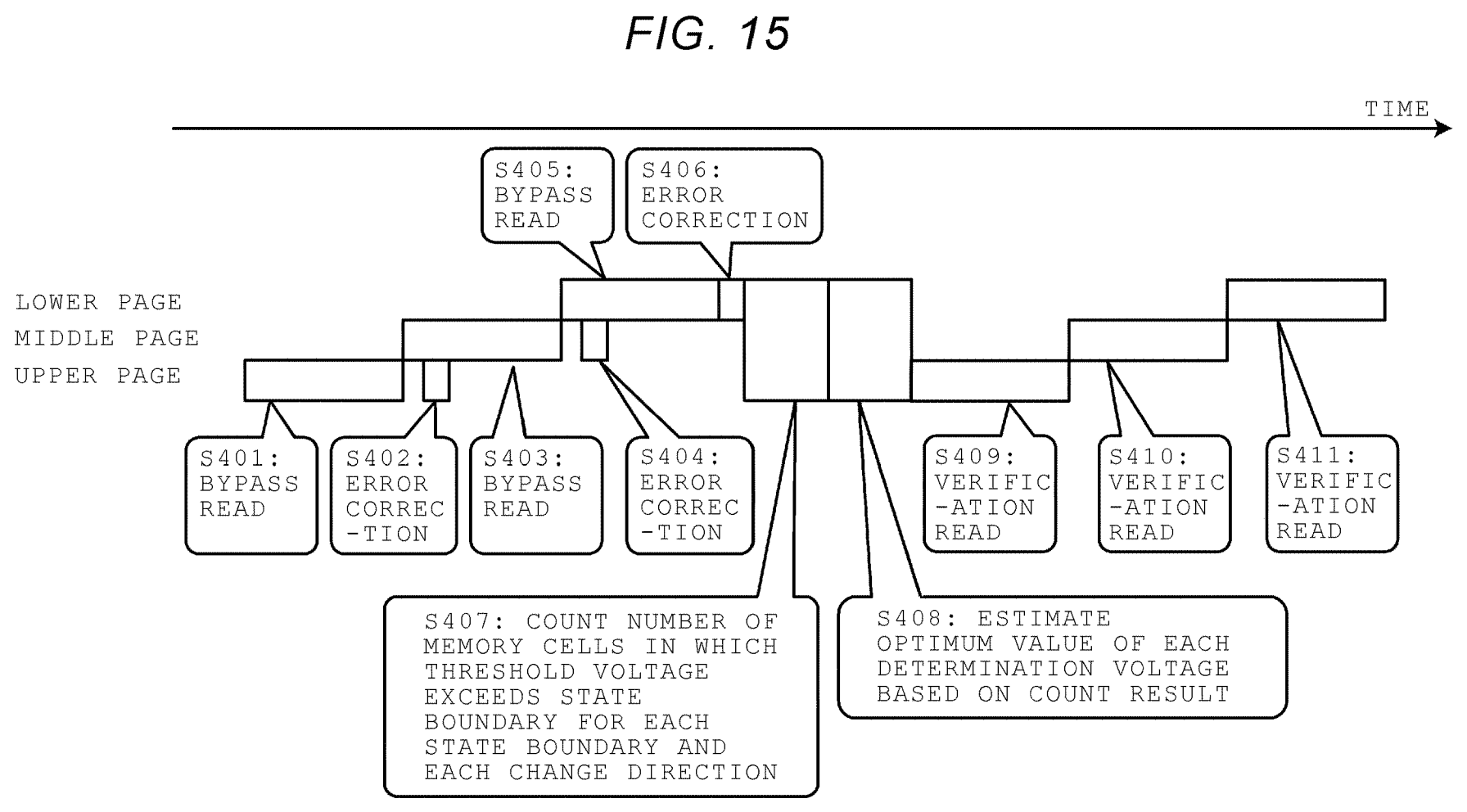

LOWER PAGE
MIDDLE PAGE
UPPER PAGE

TIME

S401:
BYPASS
READ

S402:
ERROR
CORREC
-TION

S403:
BYPASS
READ

S404:
ERROR
CORREC
-TION

S405:
BYPASS
READ

S406:
ERROR
CORRECTION

S407: COUNT NUMBER OF
MEMORY CELLS IN WHICH
THRESHOLD VOLTAGE
EXCEEDS STATE
BOUNDARY FOR EACH
STATE BOUNDARY AND
EACH CHANGE DIRECTION

S408: ESTIMATE
OPTIMUM VALUE OF EACH
DETERMINATION VOLTAGE
BASED ON COUNT RESULT

S409:
VERIFIC
-ATION
READ

S410:
VERIFIC
-ATION
READ

S411:
VERIFIC
-ATION
READ

1

MEMORY SYSTEM AND METHOD

CROSS-REFERENCE TO RELATED APPLICATION

This application is based upon and claims the benefit of priority from Japanese Patent Application No. 2023-046769, filed Mar. 23, 2023, the entire contents of which are incorporated herein by reference.

FIELD

Embodiments described herein relate generally to a memory system and a method.

BACKGROUND

In the related art, memory systems including semiconductor memories that include memory cell transistors are widely known. In such memory systems, in read operations, data stored in the memory cell transistors is determined based on comparison between threshold voltages of the memory cell transistors and determination voltages.

The threshold voltages of the memory cell transistors can change depending on various factors. Due to the changes in the threshold voltages of the memory cell transistors, data stored in the memory cell transistors may be changed to erroneous data. The memory systems execute special read operations to obtain optimum determination voltages sequentially and repeatedly on a plurality of storage regions selected by particular references so that data with fewer errors can be read. The special read operations are referred to as optimization read operations.

DESCRIPTION OF THE DRAWINGS

FIG. 1 is a diagram illustrating a configuration example of a memory system according to an embodiment;

FIG. 2 is a diagram illustrating a configuration example of a memory chip according to the embodiment;

FIG. 4 is a diagram illustrating an example of data coding according to the embodiment;

FIG. 7 is a diagram illustrating an example of a method of specifying data retention characteristics from a result of a wear-out test, as an example of a method according to the embodiment;

FIGS. 8A and 8B are schematic diagrams illustrating a difference in an information amount of source data that can be stored in one page by a difference in error correction capability by an error correction function according to the embodiment;

FIG. 9 is a diagram illustrating an example of management information used in the memory system according to the embodiment;

FIG. 10 is a schematic diagram illustrating an example of a data structure of test result information according to the embodiment;

2

Figure 12:
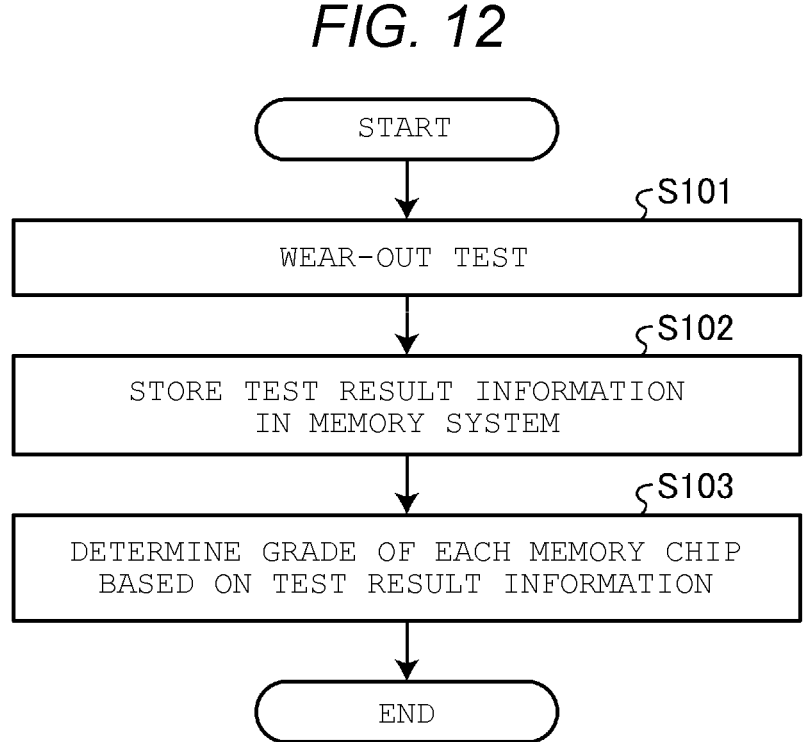
Figure 13:
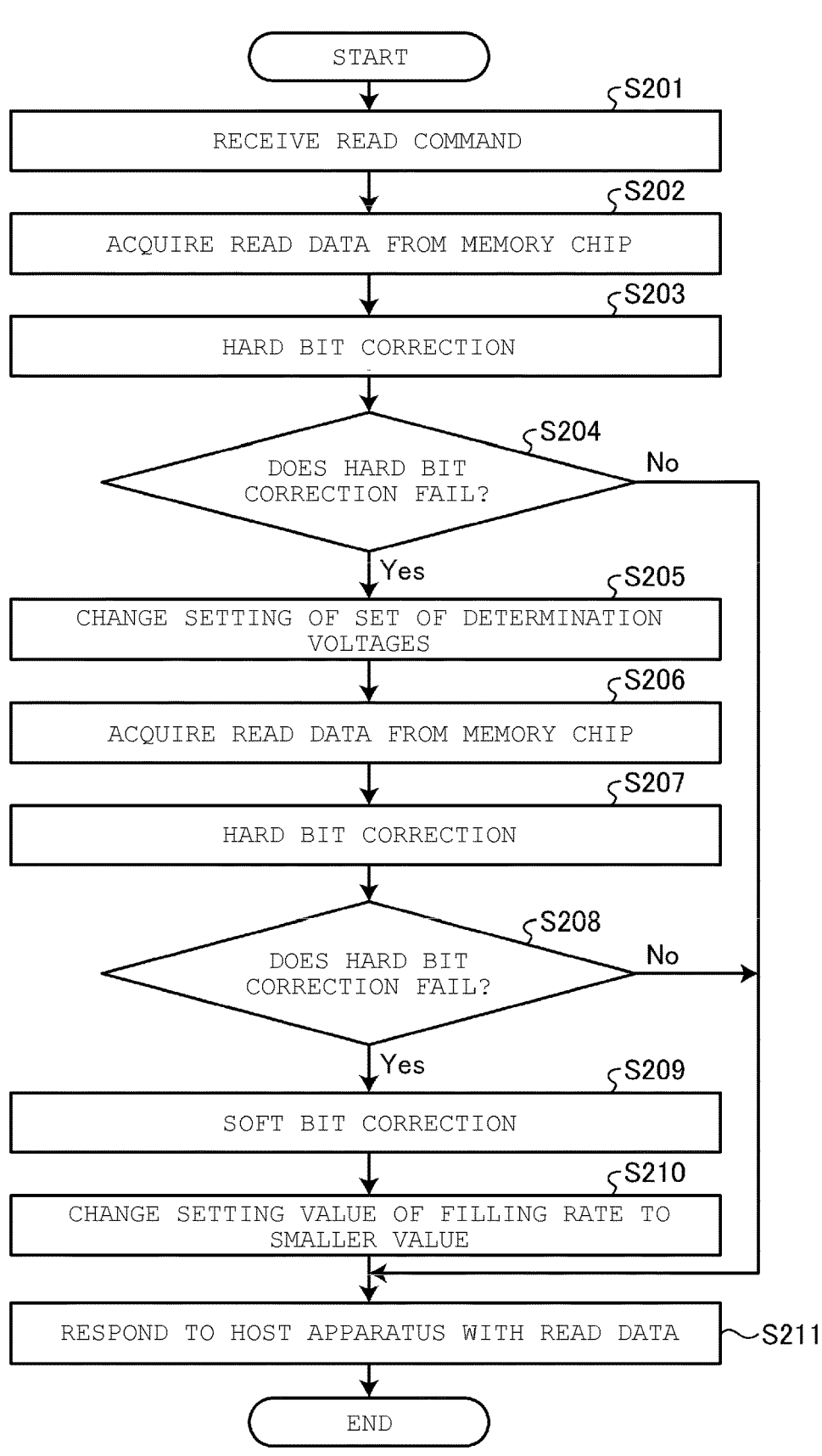
Figure 14:
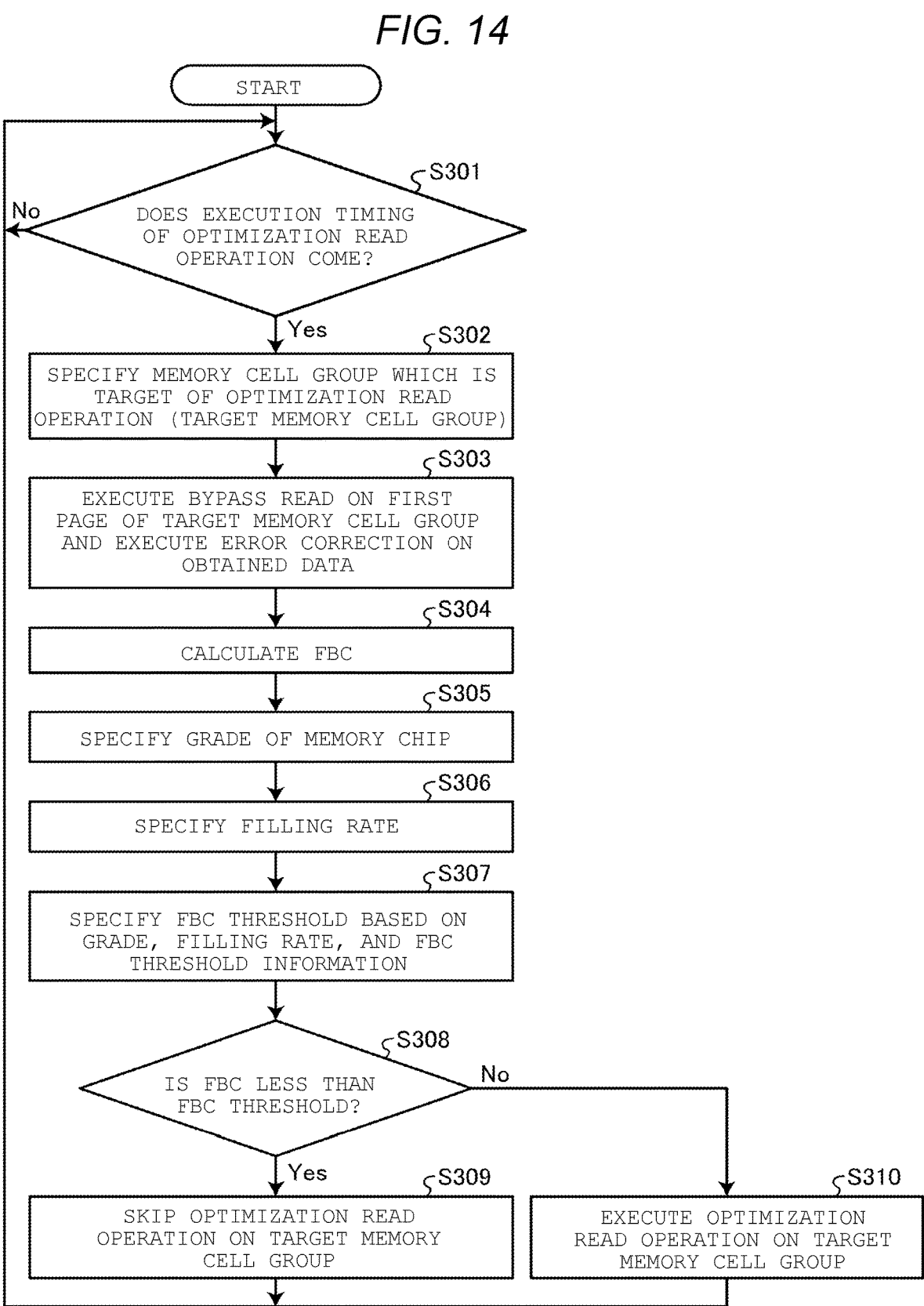

FIG. 11 is a schematic diagram illustrating an example of a data structure of FBC threshold information according to the embodiment;

FIG. 12 is a flowchart illustrating an example of an operation of the memory system according to the embodiment when conducting the wear-out test;

FIG. 13 is a flowchart illustrating an example of an operation of the memory system according to the embodiment in response to a read command from a host apparatus;

FIG. 14 is a flowchart illustrating an example of an optimization patrol operation according to the embodiment; and FIG. 15 is a timing chart illustrating an example of an optimization read operation according to the embodiment.

DETAILED DESCRIPTION

Embodiments provide a memory system and a method capable of executing an optimization read operation efficiently.

In general, according to one embodiment, a memory system includes a memory including a plurality of storage regions, each of the plurality of storage regions including a word line and a plurality of memory cells connected to the word line; and a controller. The controller is configured to execute a first operation sequentially and repeatedly on the plurality of storage regions. The first operation includes (i) acquiring first data based on comparison between a determination voltage and a threshold voltage of each memory cell in a first storage region of the plurality of storage regions, the first data being a part of second data stored in the first storage region; (ii) calculating a first fail-bit count of the first data and (iii) executing or skipping a second operation based on the calculated first fail-bit count. The second operation includes (i) acquiring the second data based on comparison between the determination voltage and the threshold voltage of each memory cell in the first storage region; (ii) calculating a second fail-bit count of the second data; and (iii) updating the determination voltage based on the second fail-bit count.

Hereinafter, a memory system and a method according to an embodiment will be described in detail with reference to the following appended drawings. The present disclosure is not limited by the embodiment.

Embodiment

Figure 1:
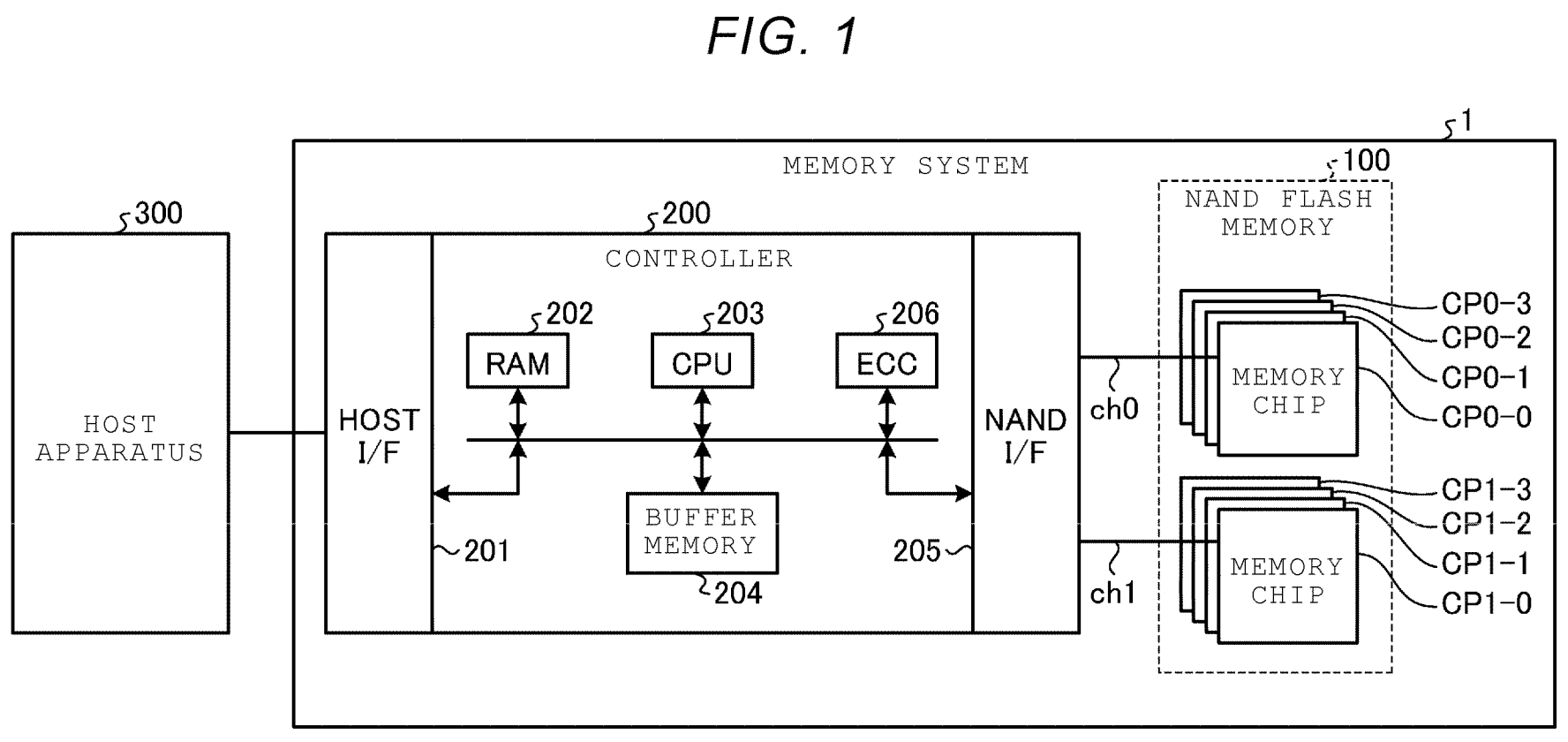

FIG. 1 is a diagram illustrating a configuration example of a memory system according to an embodiment. As illustrated in FIG. 1, a memory system 1 can be connected to a host apparatus 300. The host apparatus 300 is, for example, a server, a personal computer, a mobile information processing apparatus, or the like. The memory system 1 functions as an external storage apparatus of the host apparatus 300. The host apparatus 300 can issue a command to the memory system 1. Commands to the memory system 1 include a read command and a write command.

The memory system 1 includes a NAND flash memory 100 and a controller 200. The NAND flash memory 100 includes one or more memory chips CP. One or more channels are connected to the controller 200, and the controller 200 and one or more memory chips CP are connected to each other via the one or more channels.

Here, the memory system 1 includes memory chips CP0-0, CP0-1, CP0-2, CP0-3, CP1-0, CP1-1, CP1-2, and CP1-3 as the one or more memory chips CP and includes channels ch0 and ch1 as the one or more channels. The memory chips CP0-0, CP0-1, CP0-2, and CP0-3 are connected to the controller 200 via the channel ch0. The memory chips CP1-0, CP1-1, CP1-2, and CP1-3 are connected to the controller 200 via the channel ch1. The number of memory chips CP provided in the memory system 1 is not limited to eight. The number of channels connected to the controller 200 is not limited to two. A connection relation between the controller 200 and the one or more memory chips CP is not limited to the foregoing relation.

Each memory chip CP includes a plurality of memory cell transistors and can store data in a nonvolatile manner.

The NAND flash memory 100 is an example of a memory.

The controller 200 includes a host interface (HOST I/F) circuit 201, a random access memory (RAM) 202, a central processing unit (CPU) 203, a buffer memory 204, a NAND interface (NAND I/F) circuit 205, and an error-correcting code (ECC) circuit 206.

The controller 200 may be configured as, for example, a system-on-a-chip (SoC). The controller 200 may be configured with a plurality of chips. The controller 200 may include a field-programmable gate array (FPGA) or an application specific integrated circuit (ASIC) instead of the CPU 203. That is, the controller 200 may be configured with software, hardware, or a combination thereof. The RAM 202 may be disposed outside the controller 200.

The host interface circuit 201 is connected to the host apparatus 300 via a bus that conforms with, for example, a serial advanced technology attachment (SATA) standard, a serial attached SCSI (SAS) standard, a peripheral components interconnect (PCI) express™, or the like and is in charge of communication between the controller 200 and the host apparatus 300. A standard with which the bus connecting the host interface circuit 201 and the host apparatus 300 conforms is not limited thereto.

The NAND interface circuit 205 is connected to eight memory chips CP via two channels and is in charge of communication between the controller 200 and each memory chip CP.

The CPU 203 controls an operation of the controller 200.

The RAM 202 is used as a work region of the CPU 203. The buffer memory 204 temporarily stores data to be transmitted to the memory chip CP and data received from the memory chip CP. The RAM 202 and the buffer memory 204 may be configured with, for example, a dynamic random access memory (DRAM), a static random access memory (SRAM), or a combination thereof. A type of a memory provided in the RAM 202 and the buffer memory 204 is not limited thereto.

The ECC circuit 206 executes detection of an error and correction of a detected error using an error correction code. The detection of the error and the correction of the detected error are simply referred to an error correction. The ECC circuit 206 can execute the error correction in a plurality of modes with different error correction strengths in cooperation with the CPU 203. The plurality of modes include, for example, a hard bit correction and a soft bit correction.

The error correction in some or all of the plurality of modes may be implemented by any other circuit such as the CPU 203.

In a normal read operation executed by the controller 200, the ECC circuit 206 executes the error correction. In several cases, the controller 200 can execute a read operation in which the ECC circuit 206 does not execute the error correction. The read operation in which the ECC circuit 206 does not execute the error correction is referred to as a bypass read. In the bypass read, data can be acquired before an error is corrected. A case where the bypass read is executed will be described below.

The ECC circuit 206 is an example of an error correction circuit.

Figure 2:
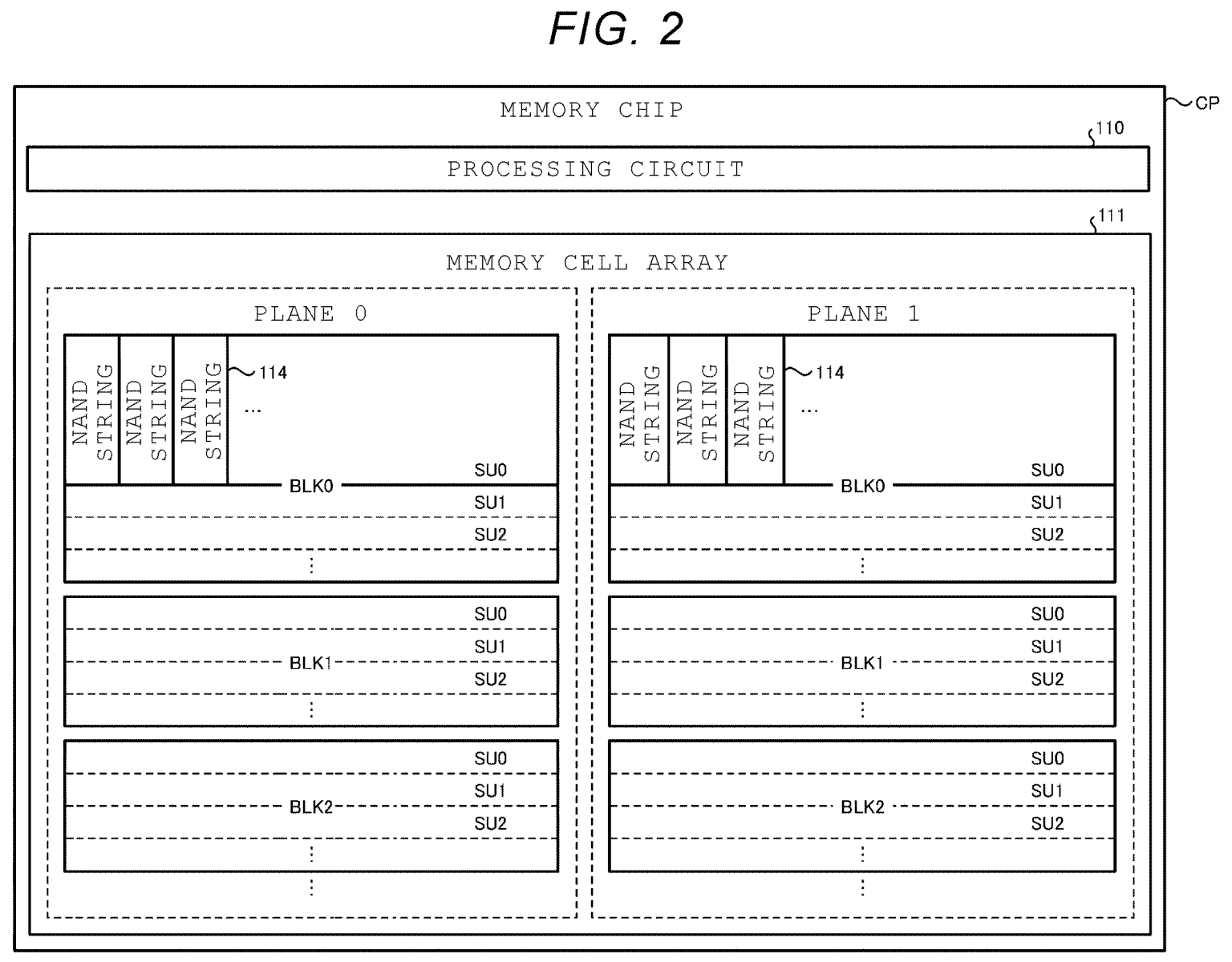

FIG. 2 is a diagram illustrating a configuration example of the memory chip CP according to the embodiment. As illustrated, the memory chip CP includes a processing circuit 110 and a memory cell array 111.

The memory cell array 111 is divided into a plurality of planes (plane 0 and plane 1). Each plane is a sub-array in which parallel access is possible. Each plane includes a plurality of blocks BLK (BLK0, BLK1, . . . ) that are a set of a plurality of nonvolatile memory cell transistors. Each block BLK includes a plurality of string units SU (SU0, SU1, . . . ) that are a set of memory cell transistors associated with a word line and a bit line. Each string unit SU includes a plurality f NAND strings 114 in which memory cell transistors are connected in series. Any number of NAND strings 114 in the string unit SU may be used. The number of planes in the memory cell array 111 is not limited to two. The memory cell array 111 may not necessarily be divided.

The processing circuit 110 includes, for example, a row decoder, a column decoder, a sense amplifier, a latch circuit, and a voltage generating circuit. The processing circuit 110 executes a program operation, a sensing operation, and an erasing operation on the memory cell array 111 in each plane in response to a command from the controller 200.

The program operation is an operation of writing data to the memory cell array 111. The sensing operation is an operation of reading data from the memory cell array 111.

A series of operations in which the controller 200 writes data to the memory chip CP is referred to as a write operation. The write operation includes a data-in operation in which the controller 200 transmits data to the memory chip CP and the program operation in which the processing circuit 110 writes the data received by the data-in operation to the memory cell array 111.

A series of operations in which the controller 200 reads data from the memory chip CP is referred to as a read operation. The read operation includes the sensing operation in which the processing circuit 110 reads data from the memory cell array 111 and a data-out operation in which the controller 200 acquires the data read by the sensing operation from the memory chip CP.

Figure 3:
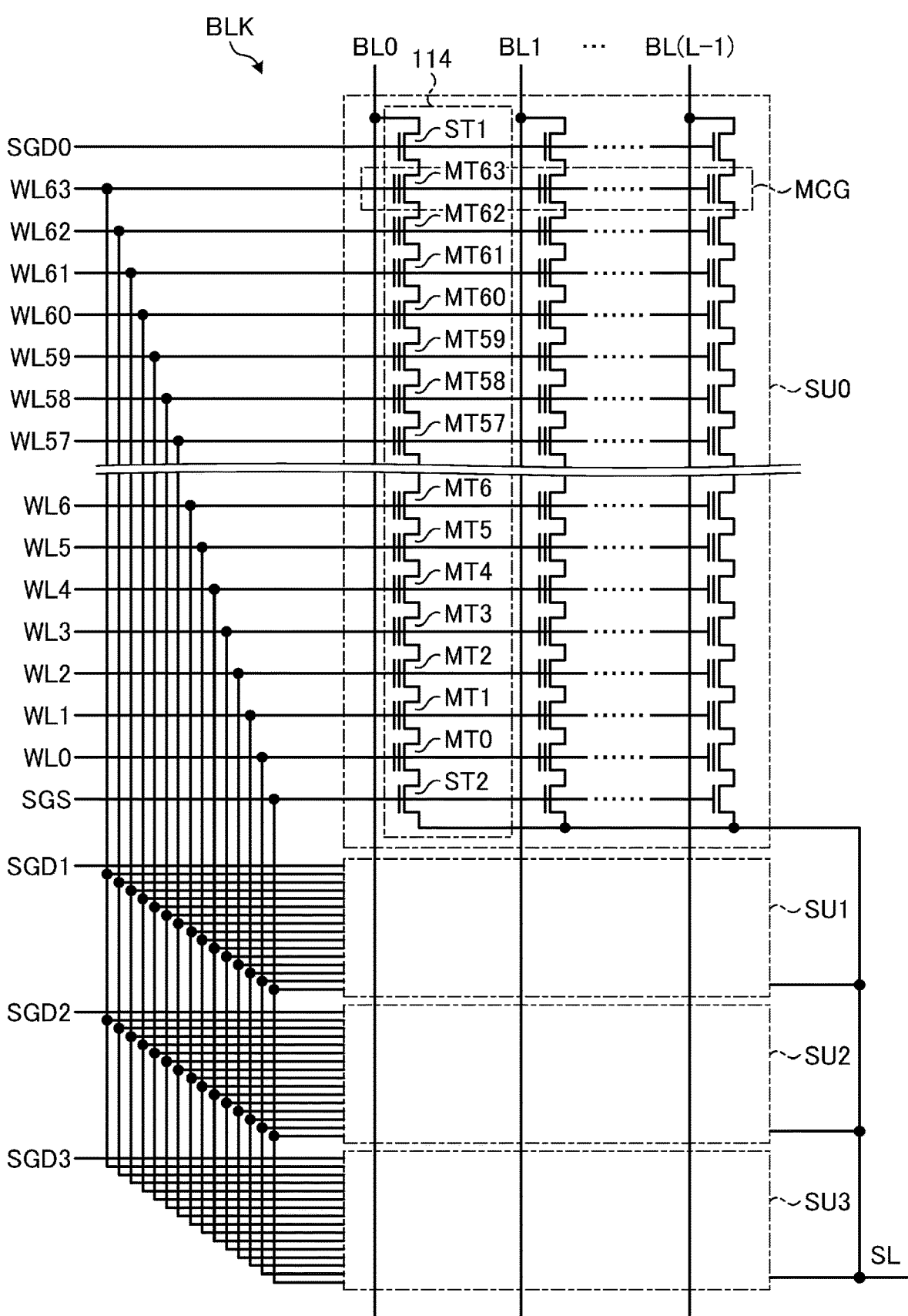
FIG. 3 is a diagram illustrating a circuit configuration of a block according to the embodiment.

FIG. 3 is a diagram illustrating a circuit configuration of the block BLK according to the embodiment. Each block BLK has the same configuration. The block BLK includes, for example, four string units SU0 to SU3. Each string unit SU includes the plurality of NAND strings 114.

Each NAND string 114 includes, for example, sixty-four memory cell transistors MT (MT0 to MT63) and select transistors ST1 and ST2. The memory cell transistor MT includes a control gate and a charge storage layer and stores data in a nonvolatile manner. The sixty-four memory cell transistors MT (MT0 to MT63) are connected in series between a source of the select transistor ST1 and a drain of the select transistor ST2. The memory cell transistor MT may be a MONOS type transistor in which an insulating film is used for the charge storage layer and may be an FG type transistor in which a conductive layer is used for the charge storage layer. Further, the number of memory cell transistors MT in the NAND string 114 is not limited to sixty-four.

Gates of the select transistors ST1 in each of the string units SU0 to SU3 are each connected to the select gate lines SGD0 to SGD3, respectively. On the other hand, gates of the select transistors T2 in each of the string units SU0 to SU3 are commonly connected to, for example, the select gate line SGS. The gates of the select transistors ST2 in each of the string units SU0 to SU3 may be connected to different select gate lines for each string unit SU, respectively. The control gates of the memory cell transistors MT0 to MT63 in the same block BLK are each commonly connected to the word lines WL0 to WL63, respectively.

Drains of the select transistors ST1 in each NAND string 114 in the string unit SU are each connected to different bit lines BL (BL0 to BL (L−1) where L is a natural number of 2 or more), respectively. The bit lines BL commonly connect one NAND string 114 in each string unit SU between the plurality of blocks BLK. Further, a source of each select transistor ST2 is commonly connected to the source line SL.

That is, the string unit SU is a set of the NAND strings 114 connected to different bit lines BL and is connected to the same select gate line SGD. The block BLK is a set of the plurality of string units SU in which the word lines WL are common. The memory cell array 111 is a set of the plurality of blocks BLK in which the bit lines BL are common.

The program operation and the sensing operation on one plane by the processing circuit 110 are executed collectively on the memory cell transistors MT connected to one word line WL in one string unit SU. Thereafter, during the program operation and the sensing operation on one plane, a group of the memory cell transistors MT that are collectively selected is referred to as a "memory cell group MCG". A storage region of a collection of 1-bit data written or read in one memory cell group MCG is referred to as a "page".

The erasing operation on one plane by the processing circuit 110 can be executed in units of blocks BLK or units smaller than the units of blocks BLK.

Hereinafter, the memory cell transistor MT is simply referred to as a memory cell.

Data of n (where n≥1) bits can be written to each memory cell. When n-bit data is written to each memory cell, a storage capacity per memory cell group MCG is equal to a size of n pages. A mode where n is 1 is referred to as a single-level cell (SLC) mode. A mode where n is 2 is referred to as a multi-level cell (MLC) mode. A mode where n is 3 is referred to as a triple-level cell (TLC) mode. A mode where n is 4 is referred to as a quad-level cell (QLC) mode.

A threshold voltage of each memory cell is controlled such that the threshold voltage of each memory cell is within a given range by the processing circuit 110. A controllable range of the threshold voltage is divided into an n-th power of 2 and a value of different n bits is assigned to each division.

In the embodiment, a mode where n is 2 or more is adopted. Hereinafter, an example in which the memory cell is used in the TLC mode as an example of the mode where n is 2 or more will be described. The embodiment is not limited to a system in which the memory cell is used in the TLC mode and can be applied to a system in which the memory cell is used in any mode where n is 2 or more.

Figure 4:
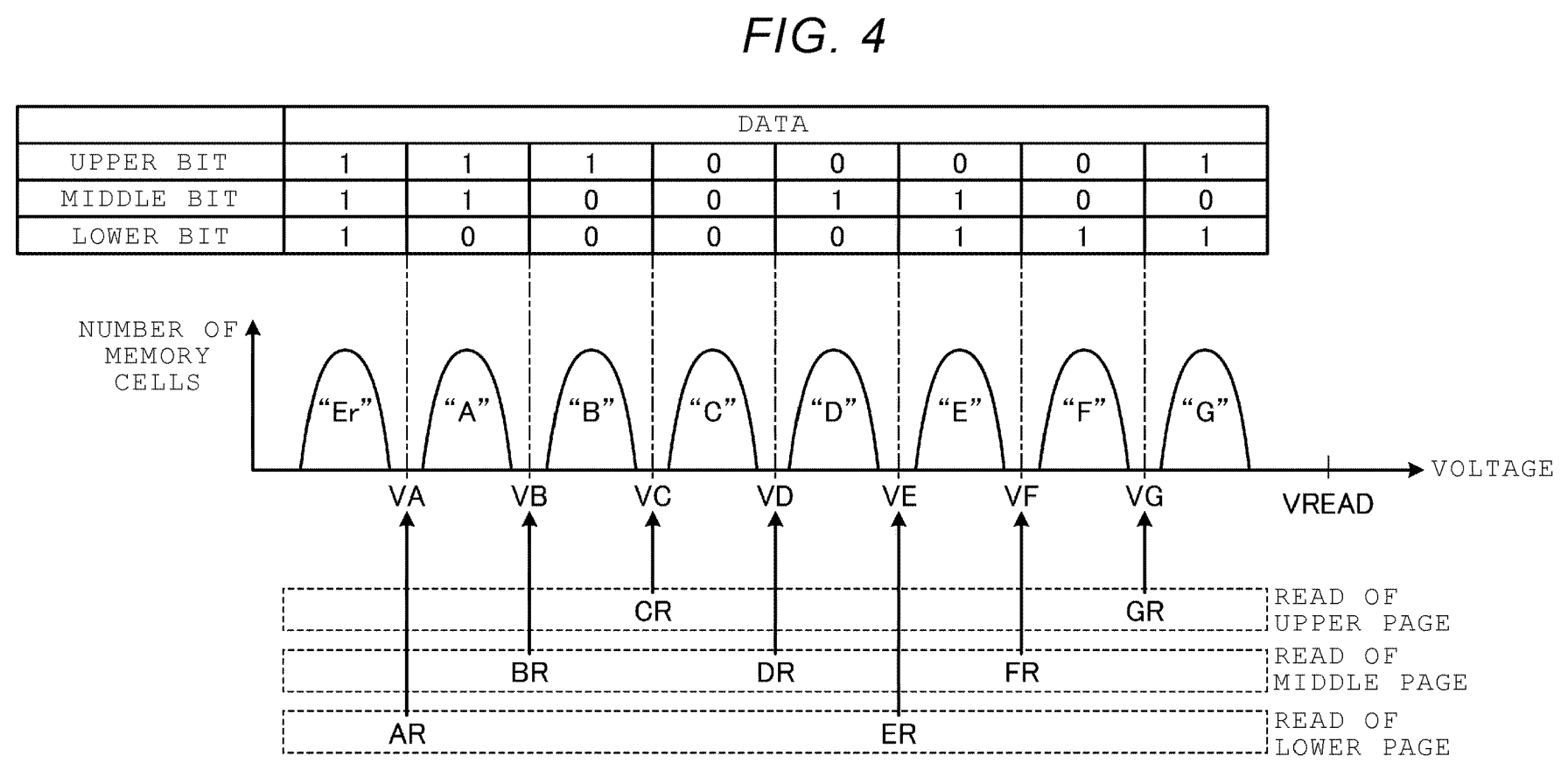

FIG. 4 is a diagram illustrating an example of data coding according to the embodiment.

As described above, in the TLC mode, 3-bit data is stored per memory cell. Bits included in the 3-bit data stored in the memory cell are respectively referred to as an upper bit, a middle bit, and a lower bit in accordance with an alignment sequence. Of three pages in the memory cell group MSG, a page in which a group of the upper bits is stored is referred to as an upper page, a page in which a group of the middle bits is stored is referred to as a middle page, and a page in which a group of the lower bits is stored is referred to as a lower page.

In the TLC mode, a range taken by the threshold voltage is divided into eight ranges. The eight ranges are called an "Er" state, an "A" state, a "B" state, a "C" state, a "D" state, an "E" state, an "F" state, and a "G" state in the lower order of the threshold voltage. The processing circuit 110 controls threshold voltage of each memory cell such that the threshold voltage belongs to one of the "Er" state, the "A" state, the "B" state, the "C" state, the "D" state, the "E" state, the "F" state, and the "G" state. As a result, when the number of memory cells for the threshold voltage is plotted, the memory cells ideally form eight robe-shape distributions which do not overlap each other and belong to different states, as illustrated in the middle part of FIG. 4. Hereinafter, a distribution for each state is simply referred to as a robe in some cases.

The eight states correspond to the 3-bit data. A table in the upper part of FIG. 4 illustrates an example of a correspondent relation between the states and the 3-bit data, that is, the example of the data coding. In this example, the "Er" state corresponds to "111", the "A" state corresponds to "110", the "B" state corresponds to "100", the "C" state corresponds to "000", the "D" state corresponds to "010", the "E" state corresponds to "011", the "F" state corresponds to "001", and the "G" state corresponds to "101". When the 3-bit data is described as "abc", it is assumed that "a" is the upper bit, "b" is the middle bit, and "c" is the lower bit. In this way, each memory cell can store data in accordance with a state to which the threshold voltage belongs. The correspondent relation between the states and the data illustrated in FIG. 4 is the example of the data coding. The data coding is not limited to the example of this drawing.

The threshold voltage can be lowered to the "Er" state by the erasing operation. The threshold voltage can be held in the "Er" state or can be raised until the threshold voltage reaches one of the "A" state, the "B" state, the "C" state, the "D" state, the "E" state, the "F" state, and the "G" state by the program operation.

Specifically, the processing circuit 110 selects a bit line BL corresponding to a column address in the program operation. The processing circuit 110 sets a voltage of the selected bit line BL to zero. The processing circuit 110 selects a word line WL corresponding to a row address and applies a programming pulse to the selected word line WL. Then, electrons are injected into the charge storage layer of the memory cell located at an intersection of the selected bit line BL and the selected word line WL. As a result, the threshold voltage of the memory cell is raised. The processing circuit 110 confirms whether the threshold voltage of the memory cell reaches a target state corresponding to the data of write data by reading the data at a certain timing. The processing circuit 110 continues applying the programming pulse until the threshold voltage of the memory cell reaches the target state.

Thereafter, a memory cell of which the threshold voltage is set in a certain state by the program operation is referred to as a memory cell belonging to the state in some cases.

Between two adjacent states, a determination voltage is set to determine data. For example, as illustrated in FIG. 4, a determination voltage VA is set between the "Er" state and the "A" state, a determination voltage VB is set between the "A" state and the "B" state, a determination voltage VC is set between the "B" state and the "C" state, a determination voltage VD is set between the "C" state and the "D" state, a determination voltage VE is set between the "D" state and the "E" state, a determination voltage VF is set between the "E" state and the "F" state, and a determination voltage VG is set between the "F" state and the "G" state.

In the sensing operation, the processing circuit 110 sequentially applies the plurality of types of determination voltages to the select word lines WL and determines whether the memory cell is in a conductive state (in other words, an ON state) and a nonconductive state (in other words, an OFF state) for each memory cell when each determination voltage is applied. Then, the processing circuit 110 determines data correlated with the state to which the memory cell belongs by a logical operation using a determination result obtained for each of the applied determination voltages. That is, the data is acquired based on comparison between the determination voltage and the threshold voltage of each memory cell.

Hereinafter, an operation of applying a single type of determination voltage VX (where X is one of A to G) to the select word line WL and determining whether the memory cell is in the ON state or the OFF state for each memory cell is referred to as an X read or an XR. A determination result obtained by the X read is referred to as a determination result XR.

When the data coding illustrated in FIG. 4 is adopted and the memory cell belongs to one of the "Er" state, the "E" state, the "F" state, and the "G" state, the lower bit of the data stored in the memory cell is "1". When the memory cell belongs to one of the "A" state, the "B" state, the "C" state, and the "D" state, the lower bit of the data stored in the memory cell is "0". Accordingly, the processing circuit 110 determines the data of the lower page by using two types of determination voltages VA and VE in the sensing operation on the lower page. Specifically, the processing circuit 110 executes an A read and an E read, and acquires the data of the lower page by the logical operation using the determination result AR obtained by the A read and the determination result ER obtained by the E read.

When the memory cell belongs to one of the "Er" state, the "A" state, the "D" state, and the "E" state, the middle bit of the data stored in the memory cell is "1". When the memory cell belongs to one of the "B" state, the "C" state, the "F" state, and the "G" state, the middle bit of the data stored in the memory cell is "0". Accordingly, the processing circuit 110 determines the data of the middle page by using three types of determination voltages VB, VD, and VF in the sensing operation on the middle page. Specifically, the processing circuit 110 executes a B read, a D read, and an F read. Then, the processing circuit 110 acquires the data of the middle page by the logical operation using the determination result BR obtained by the B read, the determination DR obtained by the D read, and the determination result FR obtained by the F read.

When the memory cell belongs to one of the "Er" state, the "A" state, the "B" state, and the "G" state, the upper bit of the data stored in the memory cell is "1". When the memory cell belongs to one of the "C" state, the "D" state, the "E" state, and the "F" state, the upper bit of the data stored in the memory cell is "0". Accordingly, the processing circuit 110 determines the data of the upper page by using two types of determination voltages VC and VG in the sensing operation on the upper page. Specifically, the processing circuit 110 executes a C read and a G read and acquires the data of the upper page by the logical operation using the determination result CR obtained by the C read and the determination result GR obtained by the G read.

In this way, the type of determination voltage used to determine the data differs depending on the type of read target page. The processing circuit 110 acquires the data of a target page on which an instruction for the read is given by combining the determination results obtained by singly using each of the plurality of types of determination voltages in accordance with the type of the target page to determine whether the threshold voltage of the memory cell is higher or lower than the determination voltage.

The sensing operation on each page is not limited to the above-described example.

The case in which the memory cell forms the eight robes which do not overlap each other is described with reference to FIG. 4. However, the threshold voltage of the memory cell can change depending on various factors.

For example, the threshold voltage of the memory cell tends to change over time elapsed since completion of the program operation. The time elapsed since the completion of the program operation may be referred to as a data retention time. A speed of the change in the threshold voltage of the memory cell is fastest immediately after the completion of the program operation and decelerates with the data retention time. The more times cycles of the erasing operation and the program operation are executed on the memory cell, the more likely the threshold voltage changes. Further, an influence of the cycles of the erasing operation and the program operation on the ease of the change in the threshold voltage varies depending on manufacturing. Accordingly, how easily the threshold voltage changes with the cycles of the erasing operation and the program operation differs for each memory chip CP, for example.

Hereinafter, the degree of the ease of the change in threshold voltage is referred to as a data retention characteristic. Good data retention characteristic (superior) indicates that the threshold voltage rarely changes. Poor data retention characteristic (inferior) indicates that the threshold voltage easily changes.

Even if there is a variation in the data retention characteristics, the threshold voltage of the memory cell can change. Therefore, in reality, during the sensing operation, two adjacent robes partially overlap with each other in some cases.

Figure 5:
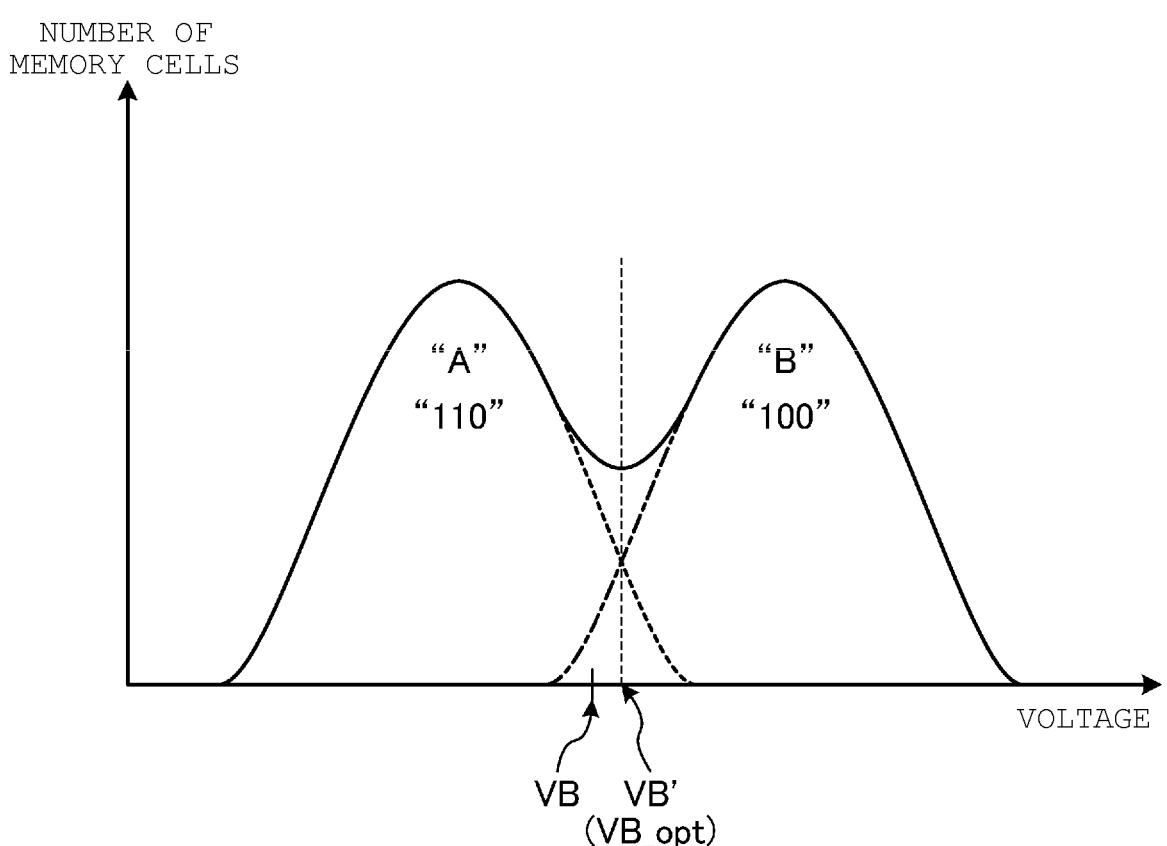
FIG. 5 is a diagram illustrating an example of a threshold voltage taken by a memory cell according to the embodiment.

FIG. 5 is a diagram illustrating an example of the threshold voltage taken by the memory cell according to the embodiment. Here, to facilitate description, a distribution of a memory cell belonging to one of the "A" state and the "B" state is illustrated. A solid line indicates the distribution of the memory cell belonging to one of the "A" state and the "B" state. A dotted line indicates a robe of the "A" state and a one-dot chain line indicates a robe of the "B" state. In the example of the drawing, the tail of the robe of the "A" state overlaps the tail of the robe of the "B" state. In other words, a maximum value of the threshold voltage of the memory cell belonging to the "A" state exceeds the determination voltage VB, and a minimum value of the threshold voltage of the memory cell belonging to the "B" state is less than the determination voltage VB. When a memory cell belonging to the "A" state and having the threshold voltage higher than the determination voltage VB is read, the memory cell is recognized to belong to the "B" state. That is, data programmed as "110" is read as "100". When a memory cell belonging to the "B" state and having the threshold voltage lower than the determination voltage VB is read, the memory cell is recognized to belong to the "A" state. That is, data programmed as "100" is read as "110".

In this way, the data read by the sensing operation may be changed from a value at a time point of the program operation with the change in the threshold voltage in some cases. The controller 200 handles the change in the threshold voltage and the data in accordance with shift of the determination voltage and the error correction. Specifically, in the controller 200, the ECC circuit 206 executes the error correction on the read data. When the error correction fails, the controller 200 changes the determination voltage and executes the read operation again. The failure of the error correction means that data before the change cannot be restored from the data after the change. Specifically, the failure of the error correction means that an error bit in the read data cannot be corrected. A success of the error correction means that all error bits in the read data have been corrected.

The determination voltage may be expressed in various amounts. For example, a fixed value is preset for each type of determination voltages (VA to VG), and the determination voltage is expressed in a shift amount (that is, a difference) from the fixed value. The fixed value is stored at a predetermined position in the memory chip CP for each type of the determination voltages. In a shift read, the controller 200 gives an instruction for a shift amount from the fixed value for each type of the determination voltages to the memory chip CP.

An expression method and an instruction method of the determination voltage are not limited thereto. For example, a value of the determination voltage may be expressed not in a difference but in a net voltage value, and an instruction for the determination voltage may be given to the memory chip CP as the net voltage value.

The controller 200 can acquire a value of a determination voltage with which the number of error bits occurring in the read data can be suppressed by a special read operation. The value of the determination voltage with which the number of error bits occurring in the read data can be suppressed is referred to as an optimum determination voltage for convenience. For example, in a case where the distribution of the threshold voltages is like the graph illustrated in FIG. 5, a voltage value VB' at which the distribution of the memory cell belonging to one of the "A" state and the "B" state reaches a minimum value is considered to be an optimum determination voltage VB_opt for the determination voltage VB. The controller 200 acquires an optimum value for each of the determination voltages VA to VG, that is, the optimum determination voltage, by executing the special read operation. The special read operation of acquiring a set of the optimum determination voltages is referred to as an optimization read operation.

The controller 200 shares one set of the determination voltages VA to VG in the plurality of memory cell groups MCG that have similar characteristics. A block of the plurality of memory cell groups MCG shared in the setting of one set of the determination voltages VA to VG is referred to as a unit region. That is, the NAND flash memory 100 includes a plurality of unit regions, and the set of the determination voltages VA to VG is individually set for each unit region. The unit region may be, for example, the block BLK, may be a region less than the block BLK, or may be the plurality of blocks BLK.

The controller 200 executes the optimization read operation sequentially and repeatedly on the plurality of unit regions (here, all the unit regions, for example). Executing the optimization read operation sequentially and repeatedly on all the unit regions is referred to as an optimization patrol operation.

Specifically, for example, one memory cell group MCG for each unit region is preset as a representative memory cell group MCG. In the optimization patrol operation, the optimization read operation is executed in order on all the representative memory cell groups MCG one by one selected from all the unit regions. When the optimization read operation is executed on one representative memory cell group MCG and then a particular first time (referred to as a patrol cycle) elapses, the optimization read operation is executed on the other representative memory cell groups MCG. When the optimization read operation is completed on all the representative memory cell groups MCG selected from all the unit regions, the optimization read operation is executed again on all the representative memory cell groups MCG selected from all the unit regions. Accordingly, when one representative memory cell group MCG is focused on, the optimization read operation is executed on the one representative memory cell group MCG at intervals of a particular second time (referred to as an individual patrol cycle).

The controller 200 stores the setting of the set of the determination voltages VA to VG for each unit region. When the optimization read operation is executed on a certain unit region, the controller 200 updates the setting of the set of the determination voltages VA to VG applied to the unit region based on the set of the optimum determination voltages obtained through the optimization read operation. During the read operation in response to the read command from the host apparatus 300, the stored set of the determination voltages VA to VG is used. Accordingly, through the optimization patrol operation, it is possible to increase a probability of the success of the error correction during the read operation in response to the read command from the host apparatus 300.

Each representative memory cell group MCG is an example of a first storage region.

Here, a technology compared with the embodiment will be described. The technology compared with the embodiment is referred to as a comparative example. According to the comparative example, the optimization read operation is simply executed at the individual patrol cycle on each unit region.

As described above, an influence of the cycles of the erasing operation and the program operation on the ease of the change in the threshold voltage varies depending on manufacturing. Accordingly, even if the number of cycles of the erasing operation and the program operation is controlled to be uniform in the memory system 1, a memory chip CP in which the threshold voltage easily changes (that is, the memory chip CP of which the data retention characteristics are poor) and a memory chip CP in which the threshold voltage rarely changes (that is, the memory chip CP of which the data retention characteristics are good) may be mixed.

In the memory chip CP of which the data retention characteristics are poor, a period in which data can be read without the failure of the error correction is short. In the memory chip CP of which the data retention characteristics are good, however, the period in which data can be read without the failure of the error correction is long. Accordingly, in the memory chip CP of which the data retention characteristics are good, data can be read for a while after execution of the program operation without the failure of the error correction even when the optimization read operation is not executed.

In the comparison example, the optimization read operation is executed at the individual patrol cycle regardless of the data retention characteristics. That is, on the memory chip CP of which the data retention characteristics are good, the optimization read operation is executed for a period in which data can be read without the failure of the error correction even if the optimization read operation is not executed, in other words, a period in which it is not necessary to execute the optimization read operation. In this way, in the comparative example, efficiency of the optimization read operation is poor since an optimization read operation that does not contribute to an improvement of the probability of the success of the error correction is executed.

When the read operation (including the optimization read operation) is executed on a page of a certain memory cell group MCG, there is a concern that a memory cell group MCG near the memory cell group MCG on which the read operation is executed may be subjected to read disturb stress, and data stored in the nearby memory cell group MCG may change. That is, in the comparative example, due to the optimization read operation that does not contribute to the improvement of the probability of the success of the error correction, a probability of the failure of the error correction in the read operation executed on the data stored in the nearby memory cell group MCG may increase.

Accordingly, in the embodiment, even if the optimization read operation is executed on a certain unit region and then the individual patrol cycle elapses, the controller 200 is configured to skip execution of the optimization read operation on the unit region if a condition is met.

The condition is that the number of error bits in data of a specific page in the representative memory cell group MCG is less than at least a threshold. Hereinafter, the number of error bits is referred to as a fail bit count (FBC). The threshold that is compared with the FBC and used in the condition is referred to as an FBC threshold.

Here, it is assumed that the optimization read operation is executed when the FBC is greater than the FBC threshold, and the optimization read operation is skipped when the FBC is less than the FBC threshold. A process when the FBC is equal to the FBC threshold is not limited thereto.

In the embodiment, the controller 200 uses a different value as the FBC threshold in accordance with the data retention characteristics.

Figure 6:
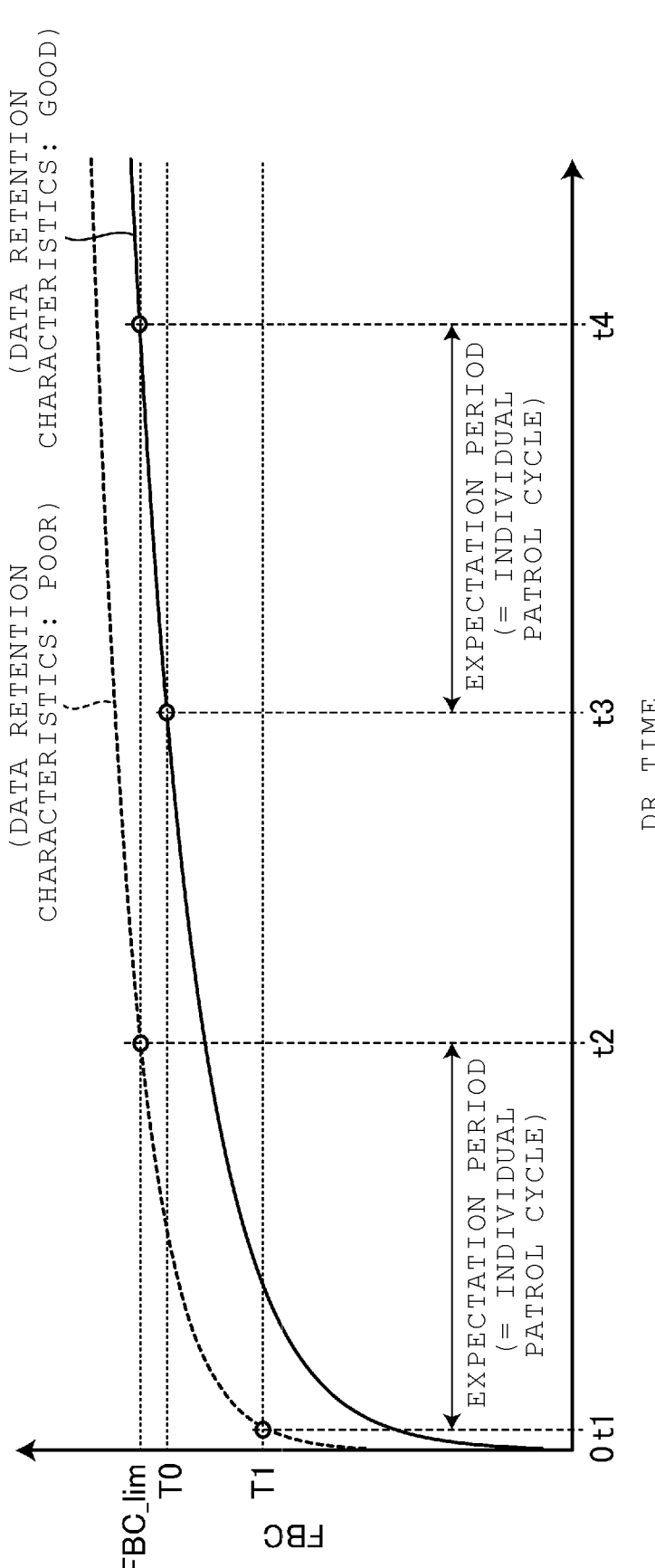
FIG. 6 is a graph illustrating two FBC thresholds used for different memory chips in the memory system according to the embodiment.

FIG. 6 is a graph illustrating two FBC thresholds used for different memory chips CP in the memory system 1 according to the embodiment. In the graph, the horizontal axis represents a data retention time and the vertical axis represents the FBC. A solid curved line indicates a relation between the FBC and the data retention time in a certain storage region of the memory chip CP of which the data retention characteristics are good (referred to as a storage region MAa). A dotted curved line indicates a relation between the FBC and the data retention time in a certain storage region of the memory chip CP of which the data retention characteristics are poor (referred to as a storage region MAb). An upper limit of the FBC at which a certain error correction (referred to as a first error correction) does not fail is referred to as an FBC_lim.

The first error correction is, for example, an error correction first executed in the read operation in response to the read command from the host apparatus 300. The details of an example of the first error correction will be described below.

In the storage region MAa, the FBC exceeds the FBC_lim, for example, when the data retention time reaches timing t4. In the storage region MAb, on the other hand, the FBC exceeds the FBC_lim, for example, when the data retention time reaches timing t2 earlier than timing t4.

In each storage region, when the optimization read operation is executed within a period corresponding to the individual patrol cycle until a timing at which the FBC exceeds the FBC_lim (referred to as an expectation period), data can be read without a failure of the first error correction even if the optimization read operation is not executed once earlier than the expectation period. Accordingly, the FBC threshold is set so that an arrival of a start timing of the expectation period can be detected.

The expectation period of the storage region MAa is a period from timing t3 to timing t4. Accordingly, a value TO is used as the FBC threshold so that an arrival of timing t3 can be detected.

The expectation period of the storage region MAb is a period from timing t1 to timing t2. Accordingly, a value T1 is used as the FBC threshold so that an arrival of timing t1 can be detected.

In this way, the FBC threshold is variable in accordance with the data retention characteristics.

In the embodiment, the data retention characteristics are specified according to a result of a wear-out test conducted in a manufacturing process. In the wear-out test, a cycle of the program operation and the erasing operation is executed a predetermined number of times on some storage regions selected from the memory chip CP (referred to as a test storage region). Thereafter, data is read from the test storage region and a bit error rate (BER) of the data is measured.

FIG. 7 is a diagram illustrating a method of specifying the data retention characteristics from the result of the wear-out test, as an example of a method according to the embodiment. In the drawing, the horizontal axis represents the bit error rate obtained from the wear-out test and the vertical axis represents the number of memory chips. That is, the drawing illustrates a distribution of the bit error rates for each memory chip CP.

In the example illustrated in FIG. 7, all the memory chips CP provided in the memory system 1 are classified into a plurality of grades according to the bit error rate. The plurality of grades include Grade A which is a grade with a low bit error rate, Grade C which is a grade with a high bit error rate, and Grade B which is a grade with an intermediate bit error rate.

The high bit error rate obtained in the wear-out test means that the data retention characteristics are poor. The low bit error rate obtained in the wear-out test means that the data retention characteristics are good.

That is, the memory chip CP belonging to Grade A is the memory chip CP of which the data retention characteristics are good, the memory chip CP belonging to Grade C is the memory chip CP of which the data retention characteristics are poor, and the memory chip CP belonging to Grade B is the memory chip CP of which the data retention characteristics are intermediate.

A method of classifying the memory chips CP into Grades A to C can be modified in various ways.

As one example, the controller 200 ranks each memory chip CP according to the bit error rate in the memory system 1. The controller 200 classifies a first percent memory chips CP of a low bit error rate into Grade A, classifies a second percent memory chips CP of a high bit error rate into Grade C, and classifies all other memory chips CP into Grade B.

As another example, a designer sets two thresholds, each corresponding to a grade boundary, based on an experiment or calculation. The controller 200 determines the grade of each memory chip CP by comparing the bit error rate with the two thresholds.

In this way, the controller 200 specifies a grade corresponding to the data retention characteristic for each memory chip CP based on the result of the wear-out test.

The data retention characteristics or the grade which is information indicating the data retention characteristics is an example of characteristic information. By specifying the grade for each memory chip CP, each unit region is associated with the grade through the memory chip CP to which the unit region belongs, that is, the characteristic information.

In the example illustrated in FIG. 7, the data retention characteristics are represented by three Grades A to C. The data retention characteristics may be represented by two grades or four or more grades.

Further, in the embodiment, a setting of error correction capability by the ECC circuit 206 is configured to be variable. Specifically, an error correction coding algorithm used by the ECC circuit 206 is an algorithm of which a code length is variable. As the code length is longer, the error correction capability is stronger, but a size of a codeword is larger. Accordingly, an information amount of source data (for example, user data) which can be stored in one page is reduced.

FIGS. 8A and 8B are schematic diagrams illustrating a difference in the information amount of the source data which can be stored in one page by a difference in the error correction capability by an error correction function according to the embodiment.

In the embodiment, in each page, data is stored in units called clusters with a size smaller than the page. The cluster is, for example, a size of a minimum unit of which a position is managed by address information used by the host apparatus 300 or data with the size of the minimum unit. The cluster is transmitted to the NAND flash memory 100 after performing one or more data processes including error correction coding by the ECC circuit 206.

FIG. 8A illustrates a state in which a cluster CL0 subjected to the error correction coding with a certain setting (referred to as a first setting) by the ECC circuit 206 is stored until no space is left in a certain page P0. In the example illustrated in the drawing, five clusters CL0 are stored in the page P0.

FIG. 8B illustrates a state in which a cluster CL1 subjected to the error correction coding with a second setting in which the error correction capability is stronger than in the first setting by the ECC circuit 206 is stored until no space is left in a certain page P1. In the example illustrated in the drawing, four clusters CL1 are stored in the page P1. In the second setting, the size of the cluster CL1 is larger than the size of the cluster CL0 since the size of the error correction code generated through the error correction coding is larger than in the first setting. Accordingly, the number of clusters which can be stored in one page is reduced.

In the present specification, a filling rate is used as an index indicating the error correction capability set in the ECC circuit 206. The filling rate is the number of clusters which can be stored in one page. A high filling rate indicates a setting in which the error correction capability is weak. A low filling rate indicates a setting in which the error correction capability is strong.

The controller 200 stores a setting of the filling rate, for example, for each unit region. That is, the filling rate may be set individually for each unit region. Units in which the filling rate is set individually are not limited thereto. The filling rate may be set in units of blocks BLK, may be set in units less than the blocks BLK, or may be set in units greater than the blocks BLK.

The lower the filling rate is, the stronger the error correction capability is. That is, as the filling rate is lower, the upper limit FBC_lim of the FBC at which the first error correction does not fail is higher. As the FBC_lim is higher, a start timing of the expectation period is delayed. Accordingly, when the grades are common, the FBC threshold is higher as the filling rate is lower.

Accordingly, in the embodiment, the FBC threshold is variable in accordance with the grade (that is, the data retention characteristics) and the filling rate.

FIG. 9 is a diagram illustrating an example of management information used in the memory system 1 according to the embodiment.

Here, for example, the management information is stored in a predetermined nonvolatile storage region (for example, the NAND flash memory 100) and is loaded onto the RAM 202 at a startup. The controller 200 updates or refers to the management information in the RAM 202 and stores an updated portion timely in the nonvolatile storage region. A method of handling the management information is not limited thereto. Some or all of the management information may be embedded in a firmware program.

The RAM 202 stores test result information 401 and FBC threshold information 402 as the management information. The test result information 401 is the result of the wear-out test. The FBC threshold information 402 is information configured to search for the FBC threshold from a combination of the grade and the filling rate.

FIG. 10 is a schematic diagram illustrating an example of a data structure of the test result information 401 according to the embodiment. In the example illustrated in the drawing, the test result information 401 has a structure of a table in which the channel and the bit error rate are recorded for each memory chip CP. The data structure of the test result information 401 is not limited thereto.

FIG. 11 is a schematic diagram illustrating an example of a data structure of the FBC threshold information 402 according to the embodiment. In the example illustrated in the drawing, the FBC threshold information 402 has a structure of a table indicating a relation among the grade, the filling rate, and the FBC threshold. The data structure of the FBC threshold information 402 is not limited thereto.

Next, detailed examples of operations of the memory system 1 according to the embodiment will be described.

FIG. 12 is a flowchart illustrating an example of an operation of the memory system 1 according to the embodiment when conducting the wear-out test.

First, in the manufacturing process, the wear-out test of each memory chip CP is conducted (S101). In the wear-out test, the test storage region is selected from each memory chip CP. For each memory chip CP, the cycles of the erasing operation and the program operation are executed a predetermined number of times on the test storage region, and then a bit error rate of data read from the test storage region is acquired. The bit error rate is acquired for each memory chip CP. The bit error rate acquired for each memory chip CP is recorded in the test result information 401 and is stored in the memory system 1 (S102).

One or both of S101 and S102 may be executed by a test apparatus or may be executed based on a special firmware program by the controller 200 of the memory system 1.

The controller 200 determines a grade of each memory chip CP provided in the memory system 1 based on the test result information 401 (S103).

The designer may determine any method of determining the grade of each memory chip CP based on the test result information 401. As described above, for example, the controller 200 may rank each memory chip CP according to the bit error rate and may determine the grade of each memory chip CP according to the rank of each memory chip CP. The controller 200 may determine the grade of each memory chip CP based on comparison between the bit error rate and one or more thresholds given from the outside.

After the process of S103, the operation when the wear-out test is conducted ends.

FIG. 13 is a flowchart illustrating an example of an operation of the memory system 1 according to the embodiment in response to the read command from the host apparatus 300.

When the read command is received from the host apparatus 300 (S201), the controller 200 acquires read data from the memory chip CP in which data requested by the read command is stored (referred (to as read data) (S202). In S202, the controller 200 uses the set of the determination voltages VA to VG that is set for the unit regions including the memory cell group MCG of a read destination.

The controller 200 executes the hard bit correction on the read data (S203). In the controller 200, the ECC circuit 206 executes the hard bit correction.

The FBC_lim described in FIG. 6 or the like is the upper limit of the FBC to avoid failing of the error correction executed on the read data first acquired in response to the read command. Accordingly, in the example illustrated in FIG. 13, the hard bit correction executed in S203 is the first error correction.

The controller 200 determines whether the hard bit correction fails (S204). When the hard bit correction fails (Yes in S204), the controller 200 changes the setting of the set of the determination voltages VA to VG (S205) and acquires the read data again from the memory chip CP using the changed set of the determination voltages VA to VG (S206).

In the process of S205, the controller 200 changes the setting of the set of the determination voltages VA to VG in accordance with a predetermined method. For example, a plurality of settings of the set of the determination voltages VA to VG are prepared in advance. The controller 200 selects a setting of the set of the determination voltages VA to VG to be used subsequently from among the settings of the set of the determination voltages VA to VG prepared in advance. A method of changing the setting of the set of the determination voltages VA to VG is not limited thereto.

The controller 200 executes the hard bit correction on the read data acquired in the process of S206 (S207). The controller 200 determines whether the hard bit correction executed in S207 fails (S208).

When the hard bit correction executed in S207 fails (Yes in S208), the controller 200 corrects an error by the soft bit correction (S209). The controller 200 changes a setting value of the filling rate to a smaller value (S210).

The controller 200 responds to the host apparatus 300 with the read data that includes no error and is obtained by the soft bit correction (S211), and ends the operation in response to the read command.

When the hard bit correction executed on the read data acquired in the process of S202 is successful (No in S204) or the hard bit correction executed on the read data acquired in the process of S206 is successful (No in S208), the controller 200 responds to the host apparatus 300 with the read data that includes no error (S211), and ends the operation in response to the read command.

The series of operations illustrated in FIG. 13 is just an example. The designer may freely determine the number and types of the error corrections on the acquired read data, the timings at which the setting of the set of the determination voltages is changed, the number of times the setting of the set of the determination voltages is changed, and the like.

FIG. 14 is a flowchart illustrating an example of the optimization patrol operation according to the embodiment.

First, the controller 200 determines whether an execution timing of the optimization read operation comes (S301).

That is, the controller 200 determines whether the time equal to the patrol cycle elapses from a later timing of a first startup timing of the memory system 1 and a timing at which the optimization read operation is executed previously in the memory system 1.

When the execution timing of the optimization read operation does not come (No in S301), the controller 200 executes the process of S301 again. When the execution timing of the optimization read operation comes (Yes in S301), the controller 200 specifies the memory cell group MCG which is a target of the optimization read operation (S302).

As described above, for each unit region, one memory cell group MCG is preset as the representative memory cell group MCG, for example. In the process of S302, the controller 200 specifies the representative memory cell group MCG which is a target of a present optimization read operation based on a predetermined order in which the optimization read operation is executed. The representative memory cell group MCG specified in the process of S302 is referred to as a target memory cell group MCG.

The controller 200 executes the bypass read on a first page of the target memory cell group MCG and executes the error correction on data obtained through the bypass read (S303).

Any method of determining the first page may be used. In a case where one memory cell group MCG includes three pages of the upper page, the middle page, and the lower page, the designer may set, for example, the upper page as the first page. The designer may set the middle page or the lower page as the first page. The designer may set a page which can be acquired fastest among the upper page, the middle page, and the lower page as the first page. The designer may set a page which tends to have many errors or a page which tends to have few errors among the upper page, the middle page, and the lower page as the first page.

As described above, the bypass read is a read operation in which the error correction is not executed. The data obtained through the bypass read may include an error. When the data obtained through the bypass read includes an error, the error is corrected by the error correction and data which does not include an error (that is, data in the same state as a time at which the program operation is executed) can be obtained. That is, in the process of S303, the controller 200 acquires two types of data including the data which may include an error and the data which does not include an error, from the first page.

The controller 200 calculates the FBC by comparing the data which may include an error with the data which does not include an error bit by bit (S304).

The controller 200 specifies the grade of the memory chip CP including the target memory cell group MCG (S305). The controller 200 specifies the filling rate of the error correction coding set in the unit region including the target memory cell group MCG (S306). The controller 200 acquires the FBC threshold to be used based on the specified grade and filling rate, and the FBC threshold information 402 (S307).

The controller 200 determines whether the FBC obtained in the process of S304 is less than the FBC threshold acquired in the process of S307 (S308).

When the FBC is less than the FBC threshold (Yes in S308), the controller 200 skips the optimization read operation on the target memory cell group MCG (S309). When the FBC is not less than the FBC threshold (No in S308), the controller 200 executes the optimization read operation on the target memory cell group MCG (S310).

After the process of S309 or the process of S310, the controller 200 executes the process of S301 again.

The series of operations of S303 to S310 illustrated in FIG. 14 is an example of a first operation.

FIG. 15 is a timing chart illustrating an example of the optimization read operation according to the embodiment.

In the example illustrated in FIG. 15, the controller 200 first executes the bypass read on the upper page of the target memory cell group MCG (S401) and executes the error correction on the data of the upper page obtained through the bypass read (S402). That is, the controller 200 acquires the data which may include an error and the data which does not include an error, from the upper page.

The process of S401 involves communication with the memory chip CP including the target memory cell group MCG, but the process of S402 can be executed only in the controller 200. Accordingly, when the process of S401 ends, the controller 200 executes the bypass read on a subsequent page, here, the middle page of the target memory cell group MCG (S403). The controller 200 executes the process of S402 in the middle of the process of S403.

The controller 200 executes the error correction on the data of the middle page obtained through the bypass read (S404). That is, the controller 200 also acquires the data which may include an error and the data which does not include an error, from the middle page.

Similarly, the controller 200 executes the bypass read on the lower page of the target memory cell group MCG (S405) and executes the error correction on the data of the lower page obtained through the bypass read (S406). That is, the controller 200 also acquires the data which may include an error and the data which does not include an error, from the lower page.

The controller 200 acquires a group of 3-bit data (referred to as a first data group) before the error correction stored in the target memory cell group MCG from the data of three pages which may include errors read from the upper page, the middle page, and the lower page. The controller 200 acquires a group of 3-bit data (referred to as a second data group) after the error correction from the data of three pages which does not include errors read from the upper page, the middle page, and the lower page. Then, the controller 200 counts the number of memory cells in which the threshold voltage is changed beyond a state boundary for each state boundary and for each change direction by comparing the first data group with the second data group for each read source memory cell (S407). Then, the controller 200 estimates an optimum value of each determination voltage based on a count result (S408).

In the process of S407, for example, at a boundary between the "A" state and the "B" state, the controller 200 counts each of the number of memory cells in which the threshold voltage is changed from the "A" state to the "B" state and the number of memory cells in which the threshold voltage is changed from the "B" state to the "A" state. Similarly, the controller 200 also counts the number of memory cells at a boundary between the "Er" state and the "A" state, at a boundary between the "B" state and the "C" state, at a boundary between the "C" state and the "D" state, at a boundary between the "D" state and the "E" state, at a boundary between the "E" state and the "F" state, and at a boundary between the "F" state and the "G" state.

For example, when the number of memory cells in which the threshold voltage is changed from the "A" state to the "B" state is larger than the number of memory cells in which the threshold voltage is changed from the "B" state to the "A" state at the boundary between the "A" state and the "B"

state, it can be estimated that the determination voltage VB is closer to a negative side than the optimum determination voltage VB_opt. As a divergence of the determination voltage VB from the optimum determination voltage VB_opt is larger, a difference between the number of memory cells in which the threshold voltage is changed from the "A" state to the "B" state and the number of memory cells in which the threshold voltage is changed from the "B" state to the "A" state is larger.

When the number of memory cells in which the threshold voltage is changed from the "B" state to the "A" state is larger than the number of memory cells in which the threshold voltage is changed from the "A" state to the "B" state, it can be estimated that the determination voltage VB is closer to a positive side than the optimum determination voltage VB_opt. As the divergence of the determination voltage VB from the optimum determination voltage VB_opt is larger, the difference between the number of memory cells in which the threshold voltage is changed from the "B" state to the "A" state and the number of memory cells in which the threshold voltage is changed from the "A" state to the "B" state is larger.

Accordingly, in the process of S408, the controller 200 estimates a divergence direction and a divergence amount of the present determination voltage VB from the optimum determination voltage VB_opt based on a magnitude relation and the difference between the number of memory cells in which the threshold voltage is changed from the "A" state to the "B" state and the number of memory cells in which the threshold voltage is changed from the "B" state to the "A" state, and estimates the optimum determination voltage VB_opt based on the estimated divergence amount and divergence direction. Similarly, the controller 200 also estimates divergence directions, divergence amounts, and optimum determination voltages V #opt, at the boundary between the "Er" state and the "A" state, at the boundary between the "B" state and the "C" state, at the boundary between the "C" state and the "D" state, at the boundary between the "D" state and the "E" state, at the boundary between the "E" state and the "F" state, and at the boundary between the "F" state and the "G" state.

After the process of S408, the controller 200 executes a verification read on the upper page, the middle page, and the lower page of the target memory cell group MCG using the set of the optimum determination voltages obtained through the estimation (S409 to S411). The verification read is a read of confirming that data can be read without the failure of the error correction. When the verification read on each page is completed, the optimization read operation ends.

The series of operations illustrated in FIG. 15, that is, the optimization read operation, is an example of a second operation.

In the above-described example, the optimization read operation is executed one time on one memory cell group MCG. A target on which the optimization read operation is executed one time may be a part of one memory cell group MCG or may be the plurality of memory cell groups MCG.

To determine whether the optimization read operation is skipped, the bypass read is executed on the first page of the target memory cell group MCG and the bypass read is executed on the first page of the target memory cell group MCG again in the subsequently executed optimization read operation. However, in the optimization read operation, the bypass read on the first page may be omitted.

More specifically, in the optimization read operation, the data which may include an error and the data which does not include an error acquired from the first page may be used to determine whether the optimization read operation is skipped.

That is, for example, when the first page is the upper page, the controller 200 may omit the processes of S401 and S402 and may use the data which may include an error and the data which does not include an error already acquired from the first page in the process of S407, in the optimization read operation illustrated in FIG. 15.

The wear-out test is conducted for each memory chip CP and the grade indicating the data retention characteristics is calculated for each memory chip CP. The grade indicating the data retention characteristics may be calculated in units different from the memory chips CP. For example, the grade may be calculated for each block BLK or for each unit region. The controller 200 manages the setting of the filling rate in association with the unit region so that the setting of the filling rate applied to the error correction coding executed on data written in each unit region can be specified regardless of the units in which the grade is calculated.

As described above, according to the embodiment, the controller 200 executes the first operation sequentially and repeatedly on the representative memory cell group MCG. The first operation is an operation of acquiring the FBC of the data of the first page stored in the target memory cell group MCG, executing the optimization read operation which is the second operation when the FBC is greater than the FBC threshold, and skipping the optimization read operation when the FBC is less than the FBC threshold, as described in the processes of S303 to S310 of FIG. 14. The second operation, that is, the optimization read operation, is an operation of acquiring the FBC of data of all the pages stored in the target memory cell group MCG and updating the setting of the set of the determination voltages based on the acquired FBC of the data of all the pages, as described with reference to FIG. 15.

Since the optimization read operation that does not contribute to an improvement of the probability of the success of the error correction is skipped, efficiency of execution of the optimization read operation is improved. It is possible to suppress the data stored in the nearby memory cell group MCG from being changed due to the read disturb stress caused by the optimization read operation that does not contribute to an improvement of the probability of the success of the error correction.

According to the embodiment, the controller 200 uses the data of the first page when determining whether the optimization read operation is skipped and uses the data of all the pages in the optimization read operation.

It takes more time to acquire the data of all the pages from the target memory cell group MCG than to acquire data of a single page. Based on the data of the single page, the controller 200 determines whether the optimization read operation is skipped. Therefore, it is possible to reduce the time necessary for the determination.

According to the embodiment, the controller 200 specifies the FBC threshold based on the grade, that is, the data retention characteristics, of the memory chip CP including the target memory cell group MCG.

As described with reference to FIG. 6, a period in which it is not necessary to execute the optimization read operation differs depending on the data retention characteristics. The FBC threshold is variable in accordance with the data retention characteristics, and thus it is possible to accurately specify the period in which it is not necessary to execute the optimization read operation.

According to the embodiment, the controller 200 specifies the FBC threshold based on the setting of the filling rate, that is, the setting of the error correction capability.

As described above, the upper limit FBC_lim of the FBC to avoid failing of the first error correction differs depending on the setting of the error correction capability. Accordingly, the period in which it is not necessary to execute the optimization read operation differs depending on the setting of the error correction capability. The FBC threshold is variable in accordance with the setting of the error correction capability, and thus it is possible to accurately specify the period in which it is not necessary to execute the optimization read operation.

In the above-described example, the controller 200 specifies the FBC threshold based on both the data retention characteristics and the setting of the error correction capability. The controller 200 may specify the FBC threshold based on only one of the data retention characteristics and the setting of the error correction capability. The controller 200 may specify the FBC threshold based on any index in addition to the data retention characteristics and the setting of the error correction capability.

For example, the patrol cycle and the individual patrol cycle are variable in accordance with a temperature of the inside or outside of the memory system 1. In this case, the controller 200 may detect the temperature of the inside or outside of the memory system 1, and may specify the FBC threshold based on a value of the detected temperature in addition to the data retention characteristics or the setting of the error correction capability.

As described above, in the optimization read operation, the set of the optimum values of the determination voltages is estimated based on the FBC of the data of all the pages stored in the target memory cell group MCG. An example of the optimization read operation is not limited thereto.

For example, in the optimization read operation, a scheme called Vth tracking may be adopted. According to the Vth tracking, the controller 200 executes the read operation on the target memory cell group MCG a plurality of times while increasing or decreasing the determination voltage by a predetermined pitch width. The controller 200 measures a distribution of the memory cells in the target memory cell group MCG as illustrated in the middle part of FIG. 4 based on a plurality of pieces of data obtained through the read operation executed a plurality of times. The controller 200 specifies seven minimum points appearing in the distribution of the memory cells and sets a voltage at each minimum point as the optimum value of the determination voltage.

In this way, in the optimization read operation, the controller 200 can acquire the set of the optimum values of the determination voltages by various methods, such as the operation illustrated in FIG. 15 or the Vth tracking. That is, in the optimization read operation, the controller 200 executes the read operation on the target memory cell group MCG and updates the setting of the set of the determination voltages based on the data obtained through the read operation.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a memory including a plurality of storage regions, each of the plurality of storage regions including a word line and a plurality of memory cells connected to the word line; and
a controller configured to:
execute a first operation on each of the plurality of storage regions, wherein
the first operation includes (i) acquiring first data by comparing a first determination voltage with a threshold voltage of each of the plurality of memory cells in a first storage region of the plurality of storage regions, the first data being a part of second data stored in the first storage region, the second data being a group of data of a plurality of bits and the first data being a group of first bits among the plurality of bits; (ii) calculating a first fail-bit count of the first data; and (iii) executing or skipping a second operation based on a comparison between the calculated first fail-bit count and a threshold value, wherein
the second operation includes (i) acquiring the second data by comparing a second determination voltage with the threshold voltage of each of the plurality of memory cells in the first storage region; (ii) calculating a second fail-bit count of the second data; and (iii) updating the second determination voltage based on the second fail-bit count, and
wherein the second operation is executed after the (ii) calculating a first fail-bit count of the first data.

2. The memory system according to claim 1, wherein the controller is configured to:
in the first operation,
execute the second operation based on the calculated first fail-bit count being greater than the threshold value; and
skip the second operation based on the calculated first fail-bit count being less than the threshold value.

3. The memory system according to claim 1, wherein each of the plurality of memory cells is configured to store the data of the plurality of bits.

4. The memory system according to claim 3, wherein the second operation further includes reading a group of data of all bits except for the first bits among the plurality of bits based on comparison between a third determination voltage and the threshold voltage of each memory cell in the first storage region, and acquiring the second data from the first data and the read group.

5. The memory system according to claim 1, wherein characteristic information is associated with each of the plurality of storage regions, and
the controller is configured to specify the threshold value based on the characteristic information associated with the first storage region in the first operation.

6. The memory system according to claim 1, further comprising:
an error correction circuit configured to change a setting of an error correction capability and to perform error correction coding on data to be written to the plurality of storage regions, wherein
the controller is configured to specify the threshold value based on the setting of the error correction capability applied to the error correction coding on the second data in the first operation.

7. The memory system according to claim 1, further comprising:
an error correction circuit configured to change a setting of an error correction capability and to perform error correction coding on data to be written to the plurality of storage regions, wherein
characteristic information is associated with each of the plurality of storage regions, and
the controller is configured to specify the threshold value based on the characteristic information associated with the first storage region and the setting of the error correction capability applied to the error correction coding on the second data in the first operation.

8. The memory system according to claim 1, wherein the controller is configured to execute an error correction on third data which is the first data or the second data, and calculate a fail-bit count of the third data based on comparison between the third data before the error correction and the third data after the error correction.

9. A method of controlling a memory, the method comprising:
executing a first operation on each of a plurality of storage regions of a memory, wherein
each of the plurality of storage regions includes a word line and a plurality of memory cells connected to the word line,
the first operation includes (i) acquiring first data by comparing a first determination voltage with a threshold voltage of each of the plurality of memory cells in a first storage region of the plurality of storage regions, the first data being a part of second data stored in the first storage region; (ii) calculating a first fail-bit count of the first data, the second data being a group of data of a plurality of bits and the first data being a group of first bits among the plurality of bits; and (iii) executing or skipping a second operation based on a comparison between the calculated first fail-bit count and a threshold value, wherein
the second operation includes (i) acquiring the second data by comparing a second determination voltage and the threshold voltage of each of the plurality of memory cells in the first storage region, (ii) calculating a second fail-bit count of the second data, and (iii) updating the second determination voltage based on the second fail-bit count, and
wherein the second operation is executed after the (ii) calculating a first fail-bit count of the first data.

10. The method according to claim 9, further comprising:
in the first operation,
executing the second operation based on the calculated first fail-bit count being greater than the threshold value; and
skipping the second operation based on the calculated first fail-bit count being less than the threshold value.

11. The method according to claim 9, wherein each of the plurality of memory cells is configured to store the data of the plurality of bits.

12. The method according to claim 11, wherein the second operation further includes reading a group of data of all bits except for the first bits among the plurality of bits based on comparison between a third determination voltage and the threshold voltage of each memory cell in the first storage region, and acquiring the second data from the first data and the read group.

13. The method according to claim 9, wherein characteristic information is associated with each of the plurality of storage regions, the method further comprises:

specifying the threshold value based on the characteristic information associated with the first storage region in the first operation.

14. The method according to claim 9, further comprising:

changing a setting of an error correction capability and performing error correction coding on data to be written to the plurality of storage regions, and specifying the threshold value based on the setting of the error correction capability applied to the error correction coding on the second data in the first operation.

15. The method according to claim 9, wherein characteristic information is associated with each of the plurality of storage regions, and the method further comprising:

changing a setting of an error correction capability and performing error correction coding on data to be written to the plurality of storage regions, and specifying the threshold value based on the characteristic information associated with the first storage region and the setting of the error correction capability applied to the error correction coding on the second data in the first operation.

16. The method according to claim 9, further comprises:

executing an error correction on third data which is the first data or the second data; and calculating a fail-bit count of the third data based on comparison between the third data before the error correction and the third data after the error correction.

17. A memory system comprising:

a memory including a plurality of storage regions, each of the plurality of storage regions including a word line and a plurality of memory cells connected to the word line; and a controller configured to:

execute a first operation on each of the plurality of storage regions, wherein the first operation includes (i) acquiring first by comparing a first determination voltage with a threshold voltage of each of the plurality of memory cells in a first storage region of the plurality of storage regions, the first data being a part of second data stored in the first storage region, the second data being a group of data of a plurality of bits and the first data being a group of first bits among the plurality of bits; (ii) calculating a first fail-bit count of the first data; and (iii) executing or skipping a second operation based on a comparison between the calculated first fail-bit count and a threshold voltage, wherein the second operation includes (i) executing a read operation on the first storage region, and (ii) updating a second determination voltage based on data obtained through the read operation, and wherein the second operation is executed after the (ii) calculating a first fail-bit count of the first data.

18. The memory system according to claim 17, wherein the controller is configured to:

in the first operation, execute the second operation based on the calculated first fail-bit count being greater than the threshold value; and skip the second operation based on the calculated first fail-bit count being less than the threshold value.

19. The memory system according to claim 17, wherein characteristic information is associated with each of the plurality of storage regions, and the controller is configured to specify the threshold value based on the characteristic information associated with the first storage region in the first operation.

20. The memory system according to claim 17, further comprising:

an error correction circuit configured to change a setting of an error correction capability and to perform error correction coding on data to be written to the plurality of storage regions, wherein the controller is configured to specify the threshold value based on the setting of the error correction capability applied to the error correction coding on the second data in the first operation.

* * * * *